UNITED STATES PATENT OFFICE.

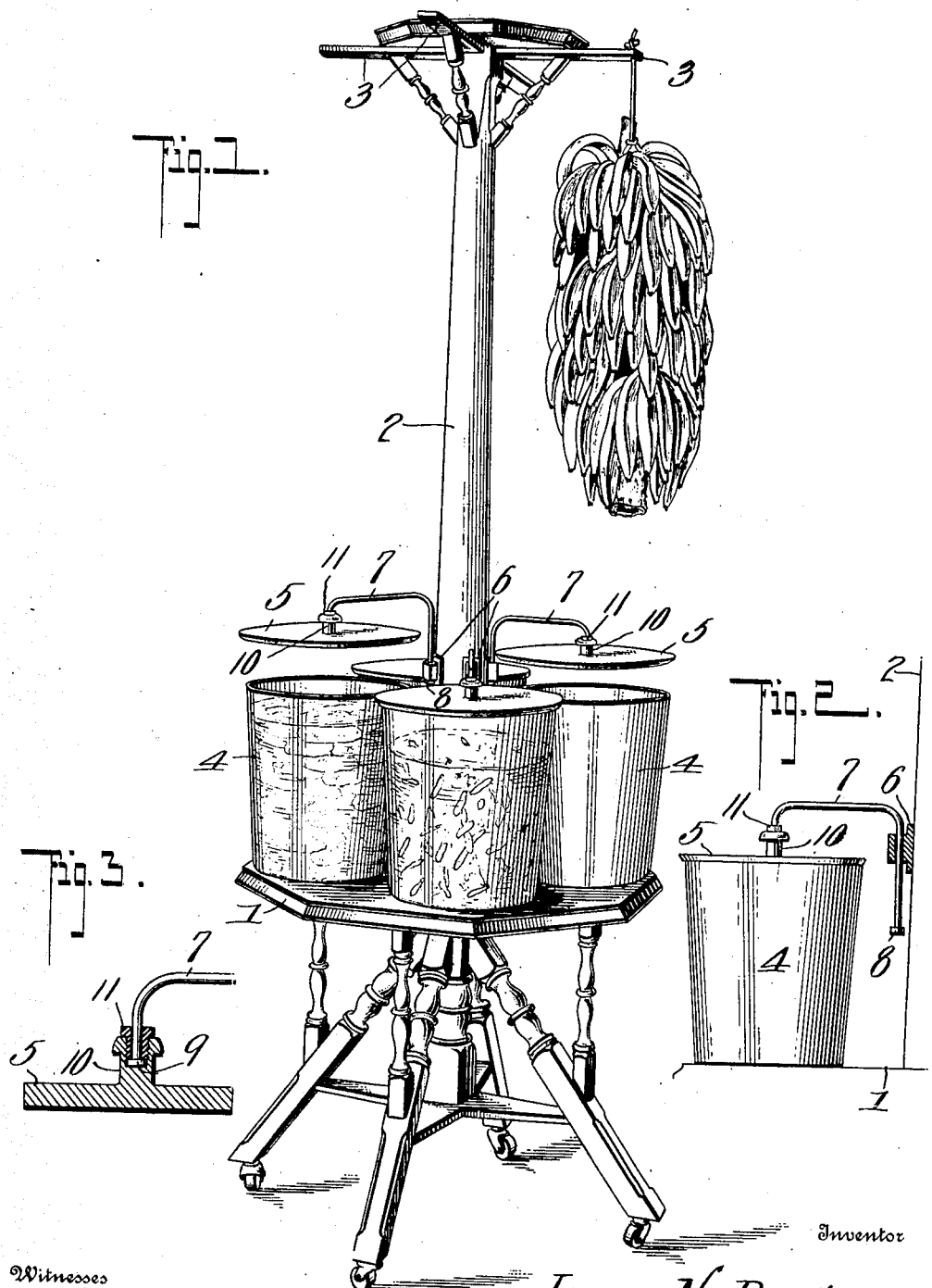

ISAAC N. DAVIS, OF WYALUSING, PENNSYLVANIA, ASSIGNOR OF ONE-HALF TO FISHER WELLES, OF WYALUSING, PENNSYLVANIA.

PICKLE-CABINET AND BANANA-DISPLAY TREE.

No. 925,876.  Specification of Letters Patent.  Patented June 22, 1909.

Application filed November 27, 1907. Serial No. 404,107.

*To all whom it may concern:*

Be it known that I, ISAAC N. DAVIS, a citizen of the United States, residing at Wyalusing, in the county of Bradford, in the State of Pennsylvania, have invented a new and useful Improvement in Pickle-Cabinets and Banana-Display Trees, of which the following is a specification.

This invention relates to a combination display rack and stand, especially designed for holding the displaying receptacles containing pickles or similar articles, and from which bunches of bananas may be suspended.

The invention consists of a table for supporting pickle jars, a central standard rising from said table and forming a banana tree, and means carried by the standard for holding covers for the pickle jars in open position.

In the accompanying drawings Figure 1 is a perspective view of the complete device. Fig. 2 is a detail side elevation partly in section showing the holding means for the covers. Fig. 3 is a detail sectional view showing the manner of securing the bail between the covers.

Constructing the device I employ a table 1 of any style or type and from the center of which rises centrally a standard 2 provided with upper cross arms 3, the said standard and cross arms forming what is known to the trade as a banana tree. Upon the table and grouped about the tree I place a plurality of jars 4 provided with removable covers 5. Upon the tree 2 and substantially in the plane of the upper edges of the jars are secured laterally extending metal lugs 6 which are vertically perforated and through said perforations slides the long arm of the bail 7. Said arm being capped at its lower end as shown at 8 to prevent accidental disengagement from the lug 6. The short arm of the bail 7 is also capped as shown at 9 and said cap fits in a socket formed in a knob 10 carried by the cover 5 and is secured in place by a perforated plug 11 through which the short arm of the bail 7 passes. The bail turns freely in the perforation of the lug 6 and when the cover is to be removed from the jar the bail is grasped by the hand and lifted upwardly and then swung upon an arc the center of which is the lug 6, the long arm of the bail 7 forming the axis. When the bail is released the weight of the cover 5 will cause the bail to bind in the lug and the cover will remain in the position in which it was placed until again swung back and lowered by hand.

Having thus fully described my invention, what I claim as new and desire to secure by Letters Patent is—

The combination with a jar support, of a standard, a bail, means for adjustably and rotatably connecting said bail to the standard, a jar cover, a knob thereon, said knob having a socket, a cap carried by an end of the bail and fitting in said socket, and a plug threading in said socket, the bail passing loosely through said plug.

ISAAC N. DAVIS.

Witnesses:
 G. M. HOFFMAN,
 ARCHIE RUSSELL.